(12) United States Patent
Fayed et al.

(10) Patent No.: US 8,901,905 B2
(45) Date of Patent: Dec. 2, 2014

(54) SYSTEM AND METHOD FOR PROVIDING POWER VIA A SPURIOUS-NOISE-FREE SWITCHING DEVICE

(75) Inventors: Ayman Adel Fayed, Ames, IA (US); Chengwu Tao, San Jose, CA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 247 days.

(21) Appl. No.: 13/397,251

(22) Filed: Feb. 15, 2012

(65) Prior Publication Data

US 2012/0212197 A1 Aug. 23, 2012

Related U.S. Application Data

(60) Provisional application No. 61/444,459, filed on Feb. 18, 2011.

(51) Int. Cl.
*G05F 1/00* (2006.01)
*G05F 1/40* (2006.01)
*H02M 3/156* (2006.01)

(52) U.S. Cl.
CPC ................................... *H02M 3/156* (2013.01)
USPC ............ 323/282; 323/271; 375/132; 375/238

(58) Field of Classification Search
USPC ............. 375/132; 323/271, 282, 284; 363/39, 363/40, 131, 132, 98; 341/143
See application file for complete search history.

(56) References Cited

U.S. PATENT DOCUMENTS

| 4,208,938 | A | * | 6/1980 | Kondo ............................. 84/651 |
| 4,327,319 | A | | 4/1982 | Swisher et al. |
| 6,275,018 | B1 | * | 8/2001 | Telefus et al. ................. 323/282 |
| 2004/0090802 | A1 | * | 5/2004 | Pourseyed et al. .............. 363/39 |
| 2007/0069930 | A1 | * | 3/2007 | Butler ............................ 341/143 |
| 2007/0210776 | A1 | * | 9/2007 | Oka .............................. 323/283 |

OTHER PUBLICATIONS

Iowa State Engineer Developing Technology to Enhance Battery Life in Portable Devices; dated printed Feb. 14, 2011; 2 pages; http://www.news.iastate.edu/news/2011/feb/regulators.

Chengwu Tao et al.; Spurious-Noise-Free Buck Regulator for Direct Powering of Analog/RF Loads Using PWM Control with Random Frequency Hopping and Random Phase Chopping; ISSCC Paper Feb. 20-24, 2011; Oct. 26, 2010; 2 pages; Iowa State University, Ames, Iowa, USA.

(Continued)

*Primary Examiner* — Timothy J Dole
*Assistant Examiner* — Shahzeb K Ahmad
(74) *Attorney, Agent, or Firm* — Reinhart Boerner Van Deuren P.C.

(57) ABSTRACT

A method of generating spurious-noise-free power from a switching device. The method includes generating an oscillating signal in the form of a series of pulse trains, and randomly changing the switching frequency, or the on-time, or both the switching frequency and the on-time of the switching device. The method further includes causing the switching device to change from a first frequency to a second frequency only at the end of a pulse train of the first frequency, and causing the second frequency to start at the beginning of its first pulse train such that no switching duty-cycle disturbance at the time of the change from first to second frequency. In a particular embodiment, the method further generates spurious-noise-free power from a switching device by implementing a relationship between the different switching frequencies involved such that spurious-noise-free operation is achieved.

15 Claims, 7 Drawing Sheets

(56) References Cited

OTHER PUBLICATIONS

Chengwu Tao et al.; A GSM Power Amplifier Directly-Powered from a DC-DC Power Converter; May 22, 2011; 3 pages.

Chengwu Tao; Control Architectures for Spur-Free Operation in Switching Power Regulators; thesis; 2011; 134 pages.

Chengwu Tao; Control Architectures for Spur-Free Operation in Switching Power Regulators; presentation; 2011; 41 pages.

Chengwu Tao; Spurious Noise Reduction Technique in Buck Converter; presentation; Sep. 30, 2010; 52 pages, Iowa State University, Ames, Iowa, USA.

Roberto Giral et al.; Interleaved Converters Operation Based on CMC; IEEE Transactions on Power Electronics; Jul. 1999; 10 pages (643-652); vol. 14, No. 4; IEEE.

Vishal Gupta et al.; Analysis and Design of Monolithic, High PSR, Linear Regulators for SoC Applications; 2004; 5 pages (311-315); IEEE.

Wing-Yee Chu et al.; A 10 MHz Bandwidth, 2 mV Ripple PA Regulator for CDMA Transmitters; IEEE Journal of Solid-State Circuits; Dec. 2008; 11 pages (2809-2819); vol. 43, No. 12; IEEE.

Steven K. Dunlap et al.; A Noise-Shaped Switching Power Supply Using a Delta-Sigma Modulator; IEEE Transactions on Circuits and Systems—I: Regular Papers; Jun. 2004; 11 pages (1051-1061); vol. 51, No. 6; IEEE.

Jennifer N. Kitchen et al.; Polar SiGe Class E and F Amplifiers Using Switch-Mode Supply Modulation; IEEE Transactions on Microwave Theory and Techniques; May 2007; 12 pages (845-856); vol. 55, No. 5; IEEE.

Jau-Horng Chen et al.; A Spurious Emission Reduction Technique for Power Amplifiers Using Frequency Hopping DC-DC Converters; 2009 IEEE Radio Frequency Integrated Circuits Symposium; 2009; 4 pages (145-148); IEEE.

Eung Jung Kim et al.; Spurious Noise Reduction by Modulating Switching Frequency in DC-to-DC Converter for RF Power Amplifier; 2010 IEEE Radio Frequency Integrated Circuit Symposium; 2010; 4 pages (43-46); IEEE.

David Su et al.; An IC for Linearizing RF Power Amplifiers Using Envelope Elimination and Restoration; 1998 IEEE International Solid-State Circuits Conference; Feb. 5, 1998; 3 pages; IEEE.

Jennifer Kitchen et al.; Combined Linear and Δ-Modulated Switched-Mode PA Supply Modulator for Polar Transmitters; 2007 IEEE International Solid-State Circuits Conference; 2007; 3 pages; IEEE.

Weiwei Xu et al.; A 90% Peak Efficiency Single-Inductor Dual-Output Buck-Boost Converter with Extended-PWM Control; 2011 IEEE International Solid-State Circuits Conference; 2011; 3 pages (394-396); IEEE.

Sungwoo Lee et al.; Robust and Efficient Syncrhonous Buck Converter with Near-Optimal Dead-Time Control; 2011 IEEE International Solid-State Circuits Conference; 2011; 3 pages (392-394); IEEE.

Tae-Hwang Kong et al.; Zero-Order Control of Boost DC-DC Converter with Transient Enhancement Using Residual Current; 2011 IEEE International Solid-State Circuits Conference; 2011; 3 pages (390-392); IEEE.

\* cited by examiner

SYSTEM AND METHOD FOR PROVIDING POWER VIA A SPURIOUS-NOISE-FREE SWITCHING DEVICE

CROSS-REFERENCE TO RELATED PATENT APPLICATION

This patent application claims the benefit of U.S. Provisional Patent Application No. 61/444,459, filed Feb. 18, 2011, the entire teachings and disclosure of which are incorporated herein by reference thereto.

FIELD OF THE INVENTION

This invention generally relates to a system and method for providing electrical power from a switching device, and more specifically to a system and method for providing electrical power without spurious noise from a switching device.

BACKGROUND OF THE INVENTION

Switching power converters are commonly used to generate regulated power supply rails out of unregulated energy sources. The generated power supply rails are used to power a variety of circuit loads. There are a variety of different types of switching power converters, such as buck converters, boost converters, buck-boost converters, flyback converters, and various other classes of converters. Additionally, switching power converters can be used as signal power amplifiers, such as Class-D amplifiers and switch-mode amplifiers, and also as supply modulators for power amplifiers such as polar power amplifiers. Typically, switching power converters produce output power from an input power source by controlling the relation between the period of time in which a switch, typically a power transistor, is turned "on" and the period of time in which the switch or power transistor is turned "off". The bursts of energy resulting from this on/off switching process are stored into energy storing elements, i.e. capacitors and inductors, which are then used to provide energy to the load when the power transistor is turned "off".

By controlling the relation between the "on" and "off" periods of the power transistor using a negative feedback loop and a reference signal (could be a DC reference or an AC signal, or a combination), a voltage at the desired level can be produced at the output. One method to control the relation between the "on" time and "off" time is to keep the total switching period ("on" time plus "off" time) always constant and only change the "on" time. This is referred to as pulse-width-modulation (PWM) control. Another method is to maintain the "on" time always constant, and only change the "off" time. This is referred to as pulse-frequency-modulation (PFM) control. Each of these methods has its advantages and shortcomings, and in many cases a switching converter will incorporate both methods and select between them depending on the application and the use conditions. Regardless of which method is used, the ultimate result is that power can be delivered to the load at the exact levels needed by the load without wasting excess energy across the power transistor. Theoretically, the efficiency of these types of switching power converters can reach 100%, but is typically less due to non-idealities associated with the power transistors and the energy storing elements.

Switching power converters are widely employed in electronic devices due to their high power-conversion efficiency. However, their output, due to periodic switching, typically contains voltage ripples with a frequency spectrum that contains concentrated energy at the switching frequency and its harmonics, i.e., spurs. In many cases, this spurious output noise interferes with the load and significantly degrades its performance. As a result, switching power converters are typically avoided for applications that are sensitive to spurious noise, such as analog and RF applications. In some instances, this spurious behavior can be mitigated using energy-inefficient linear regulators, either directly from the main power source (battery or otherwise), or as a post regulation stage between the noise-sensitive circuitry and the switching power converter. However, this strategy results in much lower power efficiency, as well as increased size and cost. Moreover, as switching frequencies of switching power converters increase, for example into the 3 MHz to 10 MHz range, in order to reduce the size of the passive components needed, and to improve the switching converter's transient performance, linear regulators become less effective in filtering the spurious noise, due to poor power supply rejection at frequencies beyond 1 MHz.

Several techniques for reducing the spurious noise of switching power converters have been proposed over the years. Some take the approach of reducing the peak-to-peak level of the switching noise. Typically, this approach includes using multi-phase regulators, which can significantly increase the cost and implementation complexity, due to the large number of passive components required and the high accuracy of the timing relationship needed between different switching phases. Active ripple cancellation, using different classes of linear amplifiers in parallel with the switching power converter, has also been explored, but this method generally results in poor efficiency due to the high bandwidth required in these amplifiers, as well as the significant ripple current they must provide to cancel out the spurious noise.

Other techniques for reducing the spurious noise of switching power converters that rely on manipulating their switching behavior have also been proposed. One of these techniques includes using either a sigma-delta or a delta modulator in the control loop. While this technique may be able to reduce spurious noise, it may also result in large and broad-band increases in the noise floor, which, in turn, may necessitate the use of additional linear regulators anyway. While the required linear regulators in these cases generally have relaxed power supply rejection requirements, from a power efficiency perspective, this approach is not an improvement over already existing schemes.

It would therefore be desirable to have a system and method of generation spurious noise-free power from a switching power converter. Embodiments of the invention provide such a switching power converter, which is free of spurious noise. These and other advantages of the invention, as well as additional inventive features, will be apparent from the description of the invention provided herein.

BRIEF SUMMARY OF THE INVENTION

In one aspect, embodiments of the invention provide a method of generating power from a switching device, wherein the method includes generating an oscillating signal in the form of a series of pulse trains, and randomly changing the switching frequency, or the on-time, or both the switching frequency and the on-time of the switching device. The method further includes causing the switching device to change from one frequency among a plurality of frequencies to a second frequency among the plurality of frequencies only at the end of a pulse train of the first frequency, and causing the second frequency to start at the beginning of its first pulse train such that no switching duty-cycle disturbance occurs at the time of the change from first to second frequency. The method further includes eliminating spurious noise by ensuring that a spur elimination condition governing the relationship between the plurality of frequencies is satisfied.

In certain embodiments of the invention, the spur elimination condition is satisfied when the spur elimination condition is satisfied when the ratio of the first frequency multiplied by the number of cycles of its pulse train to any other of the plurality of frequencies equals a rational number that is not an integer.

In a particular embodiment, the method includes randomly changing the switching frequency of the switching device comprises randomly changing the switching frequency of the switching device after one cycle at each frequency. In a more particular embodiment, the spur elimination condition is satisfied when the ratio of the first frequency to any other of the plurality of frequencies equals a rational number that is not an integer.

In another particular embodiment, the method comprises controlling the switching device using pulse-width modulation. In a more particular embodiment, the method also includes generating an end-of-cycle signal at the end of each pulse train, and using the end-of-cycle signal to trigger a random number generator whose output determines a frequency of the pulse train.

In a particular embodiment, the method comprises controlling the switching device using pulse-frequency modulation. In a more particular embodiment, the method also includes generating a beginning-of-pulse signal, using a delay circuit to generate an end-of-pulse signal, and using the end-of-pulse signal to trigger a random number counter whose output determines an off-time for each cycle of the pulse train.

In a further embodiment of the invention, the aforementioned method wherein satisfying the spur elimination condition governing the relationship between the plurality of frequencies results in a reduction in electromagnetic interference (EMI).

In another aspect, embodiments of the invention provide a switching power converter that includes an input configured to receive a first electrical signal, and an output configured to supply a second electrical signal at a desired voltage. In a more particular embodiment, the switching power converter provides an output signal that tracks a third electrical reference signal. The switching power converter also includes circuitry for controlling one or more switches to produce the desired voltage, wherein the circuitry controls the one or more switches using pulse-width modulation, such that an oscillating signal is generated using a combination of random frequency hopping and random phase chopping.

In a particular embodiment, the aforementioned switching power converter wherein the circuitry for controlling the one or more switches comprises a ramp generator configured to supply the oscillating signal, and wherein the oscillating signal comprises a series of pulse trains, each pulse train having an integer number of cycles at a corresponding frequency.

In a more particular embodiment, the ramp generator is configured to generate a series of pulse trains of two or more different frequencies. In an even more particular embodiment, each pulse train in the series of pulse trains is exactly one cycle.

In a further embodiment, an output of the ramp generator is coupled to an input of a comparator, wherein the output of the comparator provides a control signal for switching elements of the switching device.

In yet another embodiment, the input of the switching power converter is configured to receive an AC signal or a combine AC and DC signal. In a particular embodiment, an output of the switching converter has a voltage that is determined by a reference voltage. In a more particular embodiment, the reference voltage is introduced in a feedback loop of the switching power converter.

In yet another aspect, embodiments of the invention provide a switching power converter that includes an input configured to receive a first electrical signal, an output configured to supply a second electrical signal at a desired voltage. In a particular embodiment, the switching power converter provides an output signal that tracks a third electrical reference signal. The switching power converter also includes circuitry for controlling one or more switches to produce the desired voltage, and wherein the circuitry is configured to control the one or more switches using pulse-frequency modulation, such that an oscillating signal is generated using a combination of random frequency-hopping and random phase-chopping.

In a particular embodiment, the circuitry for controlling the one or more switches further comprises a constant-width pulse generator configured to supply the oscillating signal, wherein the oscillating signal comprises a series of pulse trains, and wherein each pulse train includes an integer number of cycles at a corresponding frequency. In a more particular embodiment, the constant-width pulse generator is configured to generate a series of pulse trains of two or more frequencies.

In a further embodiment, an input of the constant-width pulse generator comprises an output signal of a comparator, and an output of the constant-width pulse generator provides a control signal for switching elements of the switching device.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the invention described herein disclose a new method for generating spurious-noise-free power from a switching converter, wherein the method combines random frequency hopping with random phase chopping to control the switching power converter. In order to understand the process underlying the embodiments of the invention, it is useful to remember that, in the steady-state, the spectrum of a switching converter output supplying a load 101 can be deduced using the diagram of FIG. 1, where a pulse train 102 at the switching frequency $f_1$ is applied to a circuit 104, such as a low-pass LC filter, for example. This pulse train 102 alternates between the input power source level 106 and ground 108 with a duty-cycle determined by the voltage level required at the output 110 of the converter.

In traditional single-switching-frequency power converters, the pulse train 102 is periodic, and the spectrum of this periodic pulse train will have spurs at the switching frequency and its harmonics, hence the spurious-noise problem associated with these switching power converters. However, embodiments of the present invention use a set M of frequencies $f_1$ to $f_M$, and randomly selects one of these frequencies, which accomplishes the aforementioned random frequency-hopping. In traditional frequency-hopping, each frequency is applied for integer multiples of the same period of time regardless of which frequency is selected, resulting in the traditional frequency-hopping pulse train 112, shown in FIG. 1.

Figure 1:
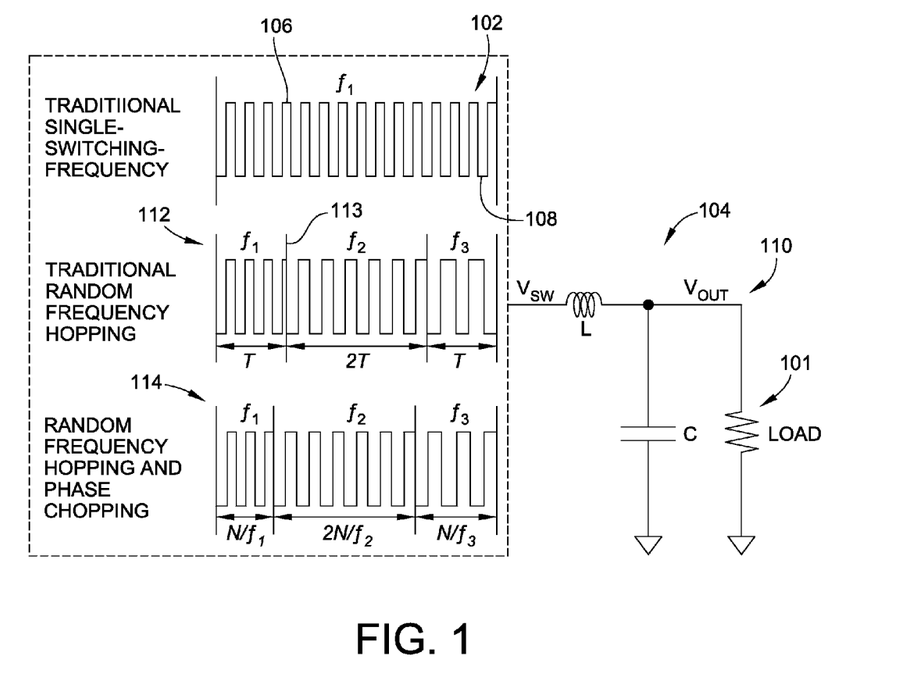
FIG. 1 is a timing diagram and a schematic circuit diagram used to derive the spectrum at the output of a switching power converter in traditional single-switching-frequency, traditional frequency-hopping with each frequency applied for multiples of the same time period, and random frequency-hopping and random phase-chopping where each frequency is applied for multiples of the same number of full cycles.

However, as illustrated by the traditional frequency-hopping pulse train 112, transitioning between different frequencies after integer multiples of a fixed time period, results in abrupt changes in the signal at transition point 113. These abrupt changes result in switching duty-cycle disturbances or transients at each transition between frequencies. Switching duty-cycle disturbances, like spurious noise, tend to degrade the performance of the load being supplied by the switching power converter. However, as opposed to traditional frequency-hopping, where each frequency is applied for integer multiples of the same period of time, embodiments of the present invention require two different criteria.

First, the period of time each frequency is applied must be exactly equal to an integer number of cycles N of the selected frequency, and therefore when a new frequency is selected, it will always be exactly at the end of a full pulse train. Second, whenever a new frequency is selected, it must start a new pulse train from scratch. The above two criteria which result in random frequency-hopping and phase-chopping pulse train 114, have some noteworthy consequences. First, they ensure that no duty-cycle disturbance will occur due to choosing a new switching frequency, because the duty-cycle of the pulse train will always be gracefully preserved when hopping from one frequency to another. Second, whenever a given frequency $f_1$ is selected, it experiences a phase shift from when it was last selected. This phase shift is also random due to the random selection of frequencies, hence implementing random phase-chopping. By ensuring a unique relationship between the switching frequencies involved, this random phase chopping results in a spur-free operation. This unique relationship is described mathematically below.

Figure 2:
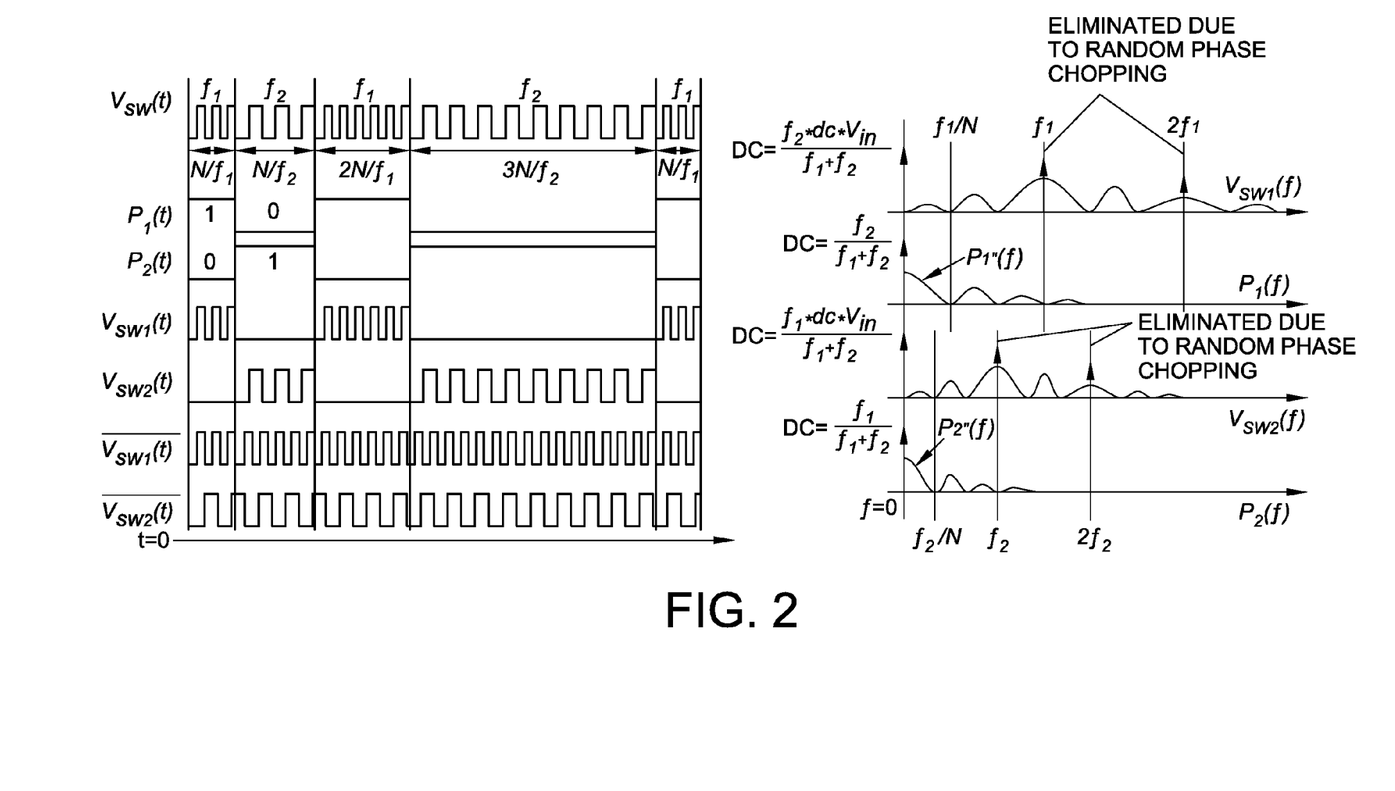
FIG. 2 is a diagram showing time and frequency domains representative of the output of the switching power converter using only two frequencies as an illustrative example of the technique.

In order to understand how the new invention eliminates spurious noise, the theoretical basis of it can be explained using the timing diagram of FIG. 2. For an intuitive analysis, we will consider the case with two frequencies, but the results equally hold for M frequencies. The spectrum of the switching node signal $V_{sw}(t)$ in FIG. 2 can be analyzed by adding the spectra of $V_{sw1}(t)=P_1(t)\times V_{sw}(t)$ and $V_{sw2}(t)=P_2(t)\times V_{sw}(t)$, where $P_1(t)$ and $P_2(t)$ are non-overlapping unipolar random digital sequences. Starting with $V_{sw1}(t)$, a virtual signal $\overline{V_{sw1}(t)}$ that matches the phase of $V_{sw1}(t)$ at time zero is constructed. Using $\overline{V_{sw1}(t)}$, one can write $V_{sw1}(t)=P_1(t)\times \overline{V_{sw1}(t-k\cdot N\Delta T_h)}$, where $\Delta T_h=(1/f_2-1/f_1)$, and k is a running integer that counts the multiples of $(N/f_2)$ that elapsed since time zero (at which $f_2$ is applied and not $f_1$). Note that k can increase indefinitely. The time delay applied to $\overline{V_{sw1}(t)}$ is to account for the fact that each time $f_1$ is applied beyond the first occurrence, $V_{sw1}(t)$ resets its phase, and thus its phase no longer matches the phase of $\overline{V_{sw1}(t)}$ (i.e., phase chopping). Since $\overline{V_{sw1}(t)}$ is a periodic function, we can use its Fourier series to write:

$$V_{SW1}(t) = \left[\left(\frac{f_2}{f_1+f_2}\right)+\overline{P_1(t)}\right]\times \qquad (1)$$

$$\left[(V_{in}\cdot dc)+\sum_{j=1}^{j=\infty}\gamma_j\sin(2\pi\cdot j\cdot f_1(t-k\cdot N\Delta T_h)-\phi_j)\right]$$

where $\gamma_j$ and $\phi_j$ are the coefficient and phase of the $j^{th}$ harmonic of $\overline{V_{sw1}(t)}$ respectively, dc is the switching duty-cycle, and $\overline{P_1(t)}$ is the non-spurious part of $P_1(t)$. Note that $P_1(t)$ does not contain any impulses (i.e., spurs), except at DC due to randomization.

All terms in Eq. 1 are non-spurious except:

$$\left(\frac{f_2}{f_1+f_2}\right)\times\sum_{j=1}^{j=\infty}\gamma_j\sin(2\pi\cdot j\cdot f_1(t-k\cdot N\Delta T_h)-\phi_j),$$

which can be further factorized as Eq. 2 below:

$$\left(\frac{f_2}{f_1+f_2}\right)\times\sum_{j=1}^{j=\infty}\gamma_j\times[\cos(2\pi\cdot jk\cdot f_1N\Delta T_h)\times\sin(2\pi\cdot jf_1t+\phi_j)-$$

$$\sin(2\pi\cdot jk\cdot f_1N\Delta T_h)\times\cos(2\pi\cdot jf_1t+\phi_j)]$$

As shown in Eq. 2, spurs will exist at all frequencies $(j\times f_1)$. However, $\Delta T_h$ (phase chopping), can be manipulated by the new invention to eliminate spurs at $(j\times f_1)$ by choosing $f_1 N\Delta T_h=(m/n)\neq$Integer, where m and n are arbitrary integers and $n\neq 1$. First, this ensures that the running integer k assumes a value from a finite set of integers [1, 2, . . . , n] with an equal possibility of taking any value in the set. Second, using the Dirichlet kernel, it can be shown that the average of the spur at $(j\times f_1)$, resulting from Eq. 2, will be eliminated for all $j\neq$(Integer$\times$Nn). Thus, the first spur appears at (Nn$\times f_1$) when (j=Nn). However, if n is chosen large enough, this spur drops below the noise floor, since $\gamma_j$ will be very small, and therefore all spurs are practically eliminated.

Average spur magnitude at ($f=j\times f_1$) due to the factor:

$$\left(\frac{f_2}{f_1+f_2}\right)\times\gamma_j\times\cos(2\pi\cdot j\cdot k\cdot f_1 N\Delta T_h)$$

in Eq. 2:

$$\frac{1}{n}\left(\frac{f_2}{f_1+f_2}\right)\times\gamma_j\times\sum_{k=1}^{n}\cos(2\pi\cdot j\cdot k\cdot f_1 N\Delta T_h)\to\text{for any }j=1\text{ to }\infty$$

Dirichlet kernel $\to D_n(x)=1+2\sum_{k=1}^{n}\cos(kx)=\frac{\sin(nx+x/2)}{\sin(x/2)}$, Therefore:

$$\frac{1}{n}\left(\frac{f_2}{f_1+f_2}\right)\times\gamma_j\times\sum_{k=1}^{n}\cos(2\pi\cdot j\cdot k\cdot f_1 N\Delta T_h)=\frac{1}{n}\left(\frac{f_2}{f_1+f_2}\right)\times\gamma_j\times$$

$$\frac{1}{2}\times\frac{\sin(n\cdot 2\pi\cdot j\cdot f_1 N\Delta T_h+\pi\cdot j\cdot f_1 N\Delta T_h)-\sin(\pi\cdot j\cdot f_1 N\Delta T_h)}{\sin(\pi\cdot j\cdot f_1 N\Delta T_h)}$$

can be made equal to zero if $n\cdot(2\pi\cdot j\cdot f_1 N\Delta T_h)=(1,2,3,\ldots)\cdot 2\pi$, and;

$(\pi\cdot j\cdot f_1 N\Delta T_h)=(1,2,3,\ldots)\cdot\pi$

Hence, the condition can be written as:

$$f_1 N\Delta T_h=\left(\frac{m}{n}\right),$$

where $m=(1,2,3,\ldots),$ and $\left(\frac{j}{n}\right)\neq\text{Integer}$

The condition applies equally for the factor:

$$\left(\frac{f_2}{f_1+f_2}\right)\times\gamma_j\times\sin(2\pi\cdot j\cdot k\cdot f_1 N\Delta T_h)$$

in Eq. 2.

Using the same analysis for $V_{sw2}(t)$, and observing that setting $f_1 N\Delta T_h=(m/n)$ results in $f_2 N\Delta T_h=(Nm)/(Nn+m)$, spurs at ($j\times f_1$) are eliminated for all $j\neq\text{Integer}\times(Nn+m)$, provided that the condition $(Nm)/(Nn+m)\neq\text{Integer}$ is satisfied. That is, ensuring that the spur elimination condition $fN\Delta T_h\neq\text{Integer}$ is satisfied for two frequencies $f=f_1$ and $f=f_2$ results in the elimination of all spurious noise. In the general case of M frequencies, the spur elimination condition becomes $N\times(f_1/f_i)\neq\text{Integer}$, for $i=2$ to M.

Satisfying the spur elimination condition is not guaranteed for any choice of N, m, and n and careful choice of these parameters is needed. Nevertheless, for the simple case N=1, (Nm)/(Nn+m) becomes m/(n+m), which is guaranteed not to be an integer for any choice of m and n, thus automatically satisfying the condition of spur elimination for $V_{sw2}(t)$. In this simple case, the condition for total spur elimination becomes $(f_1-f_2)/f_2=m/n\neq\text{Integer}$ in the case of only two switching frequencies. In the general case of M frequencies, the spur elimination condition for the case of N=1 becomes $f_1/f_i=(n_i+m_i)/n_i\neq\text{Integer}$ for $i=2$ to M, where $m_i$ and $n_i$ are arbitrary positive integers.

Figure 3:
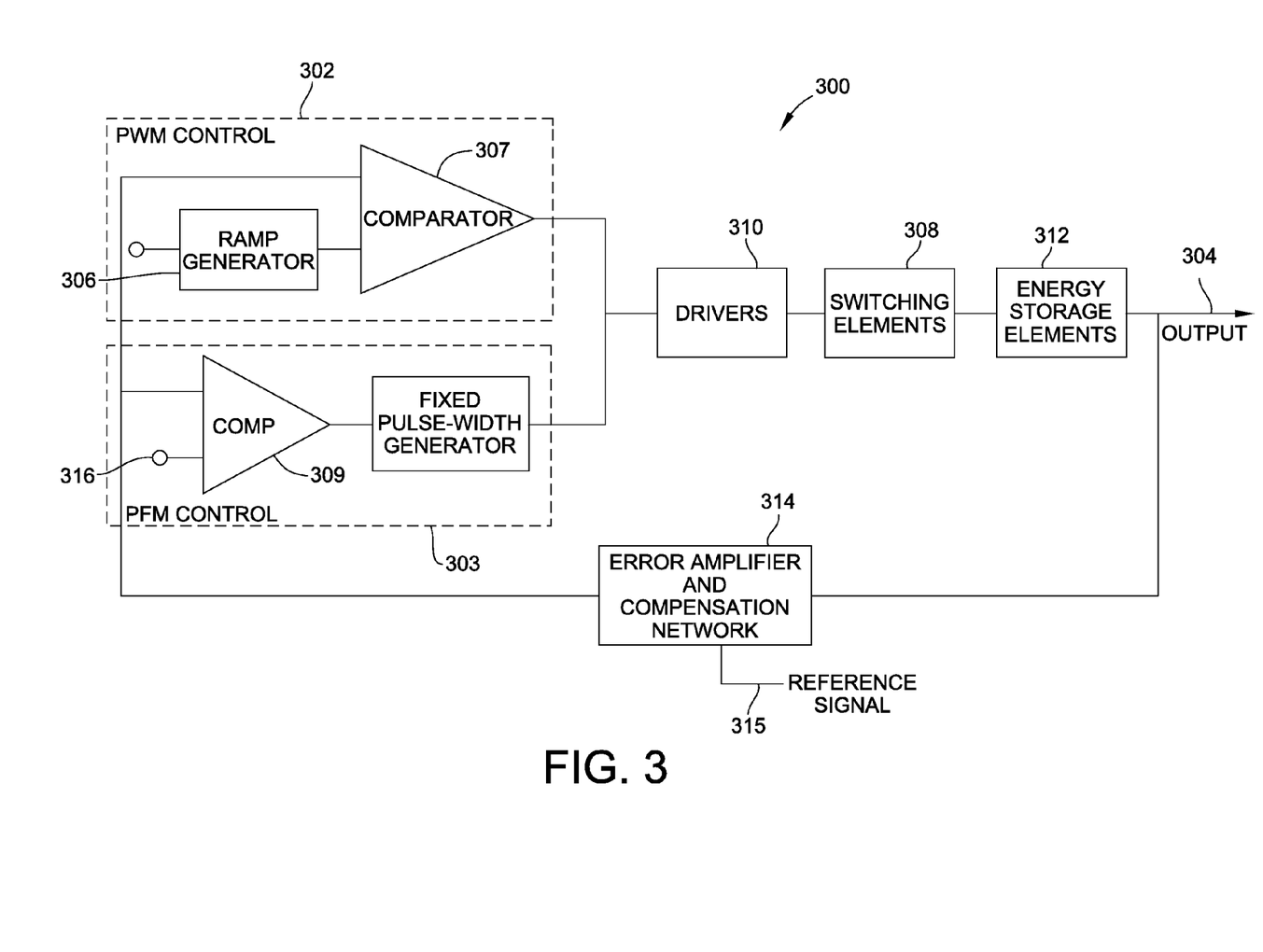
FIG. 3 is a block diagram showing an exemplary switching power converter, according to an embodiment of the invention.

FIG. 3 is a block diagram of an exemplary switching power converter 300 having a PWM control circuit 302 (shown in phantom), a PFM control circuit 303 (shown in phantom), and an output 304. In various embodiments of the invention, the power switching converter 300 could be a boost converter in which the output voltage is equal to or greater than the input voltage, a buck converter in which the output voltage is equal to or less than the input voltage, an inverting or non-inverting buck-boost converter in which the output voltage could be any voltage though opposite in polarity to the input voltage, or a flyback converter in which the output voltage could be any voltage though opposite in polarity to the input voltage, or a supply modulator, or a Class-D amplifier, or a polar power amplifier where in all of the above the output tracks the reference signal 315. The output 304 is configured to generate a signal at a desired voltage level that is determined by the reference signal 315, which can be DC, AC, or a combination. The PWM control circuit 302 and PFM control circuit 303 are both shown in phantom because embodiments of the power switching converter 300 include either the PWM control circuit 302 or the PFM control circuit 303, or both.

In at least one embodiment, the PWM control circuit 302 includes a ramp generator 306 and a first comparator 307. In a particular embodiment of the invention, an output of the ramp generator 306 is one input of the first comparator 307. The output of the first comparator 307 is the output for the PWM control circuit 302. In a further embodiment, PFM control circuit 303 includes a second comparator 309 whose output serves as an input to a constant-width pulse generator 306, whose output serves as the output for the PFM control circuit 303.

Outputs of the PWM control circuit 302 and the PFM control circuit 303 are each coupled to one or more switching elements 308, which, in some embodiments, includes power transistors. In at least one embodiment of the invention, a driver stage 310 is interposed between the signal generator 306 and switching element(s) 308. The output of the PWM control circuit 302 and/or PFM control circuit 303 determines the on/off time, or duty cycle, of the switching element(s) 308. The switching element(s) 308 are coupled to energy storage elements 312, which includes capacitors and/or inductors. The configuration of the energy storage elements 312 will vary according to the particular type of switching power converter and may include resistors and/or diodes.

Figure 4:
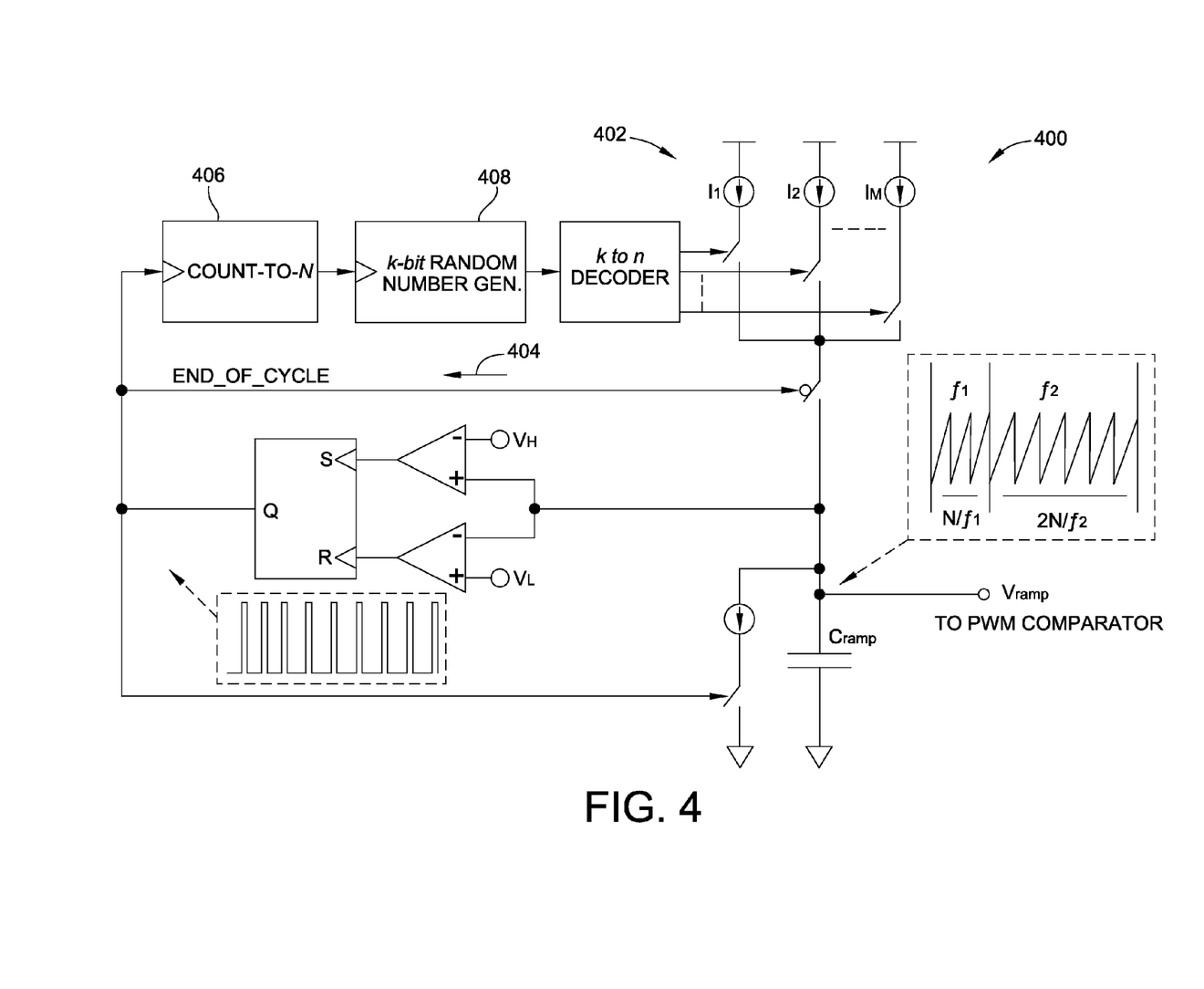
FIG. 4 is a schematic circuit diagram of an exemplary ramp generator, according to an embodiment of the invention.

In the pulse-width-modulation (PWM) control case, a particular embodiment of the invention includes the switching power converter 300, which includes a ramp generator 400, arranged as shown in the schematic circuit diagram illustrated in FIG. 4. It is important to note that there are other possible circuit implementations that can implement the essence of the new invention, embodiments of which are described herein. As such, FIG. 4 shows only one possible implementation. As such, the scope of this invention is not limited to this particular embodiment.

The ramp generator 400 of FIG. 4 uses two reference voltages (i.e., $V_H$ and $V_L$) to generate the ramp signal by integrating one of the ramp currents $I_1$ to $I_M$ from a plurality of current sources 402, resulting in corresponding ramp frequencies $f_1$ to $f_M$ respectively. The End_of_Cycle signal 404 produced at the end of each ramp cycle triggers a count-to-N counter 406, which triggers an k-bit pseudo-random number generator 408 every N ramp cycles. This determines the ramp frequency for the next N ramp cycles, hence implementing both random frequency-hopping and phase-chopping. Since frequencies $f_1$ to $f_M$ are directly proportional to the ramp currents $I_1$ to $I_M$ respectively, the relation between these currents have to satisfy the conditions of spur elimination, as described above.

Figure 5:
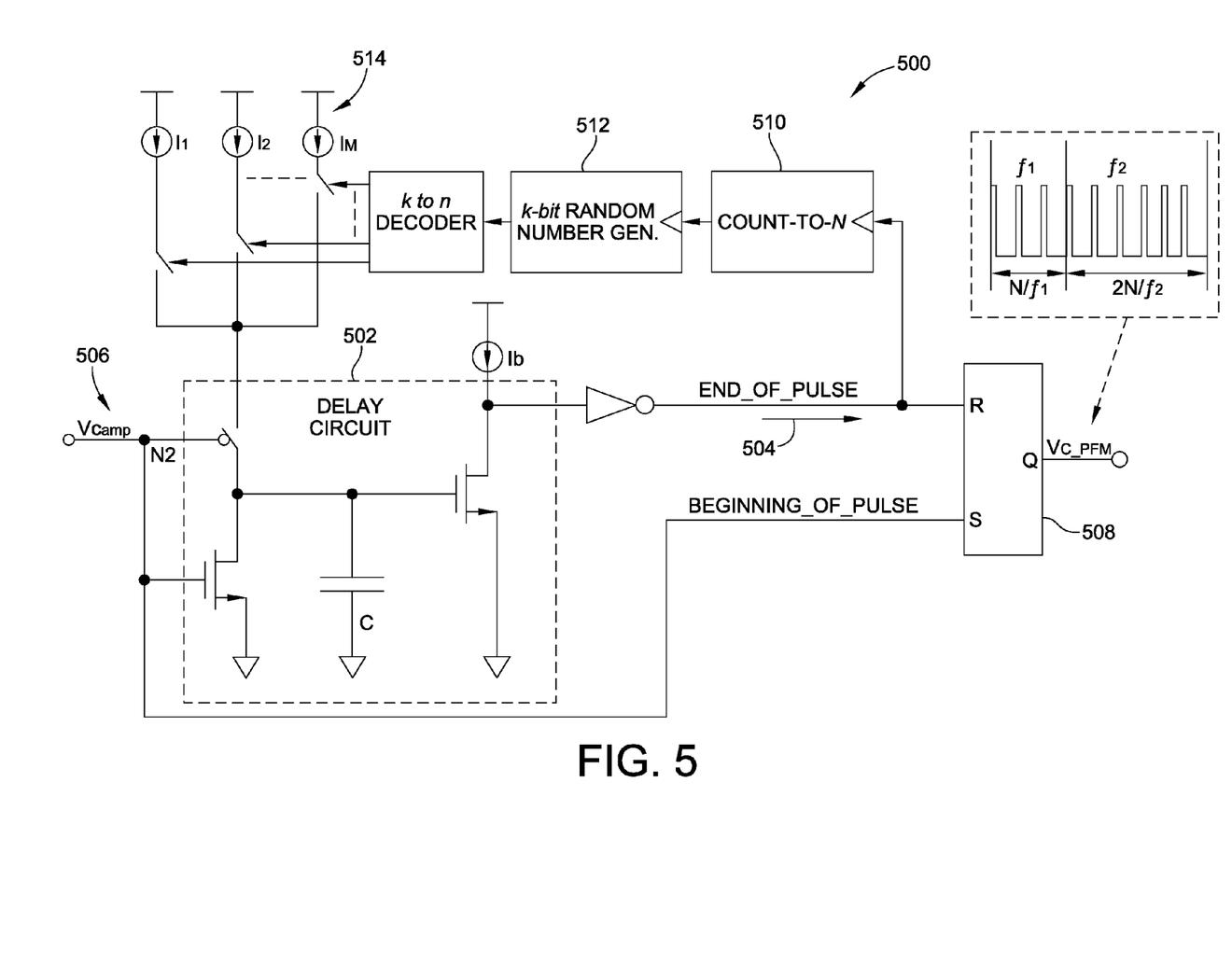
FIG. 5 is a schematic circuit diagram of an exemplary constant-width pulse generator, according to an embodiment of the invention.

In the pulse-frequency-modulation (PFM) control case, a particular embodiment of the invention includes the switching power converter 300 of FIG. 3, which, in turn, includes a constant-width pulse generator 500, arranged as shown in the schematic circuit diagram illustrated in FIG. 5. As in the PWM case, there are various possible circuit configurations that can implement the essence of the new invention. As such, the scope of this invention is not limited to the particular exemplary embodiments described herein.

In FIG. 5, the constant-width pulse generator 500 uses a delay circuit 502 to generate an End_of_Pulse signal 504, which is nothing but a delayed version of the $V_{comp}$ signal 506 (also called the Beginning_of_Pulse signal). An RS latch 508 uses both signals to generate the "on" pulse for the switching power converter. This pulse will have a width equal to the time delay between the End_of_Pulse 504 and Beginning_of_Pulse 506 signals, which is determined by the delay circuit 502. The End_of_Pulse signal 504 triggers a count-to-N counter 510, which triggers an k-bit pseudo-random number generator 512 every N-cycles, and thus determining the "on" pulse width for the next N ramp cycles. To control the "on" pulse width, the delay circuit integrates one of the currents $I_1$ to $I_M$ from a plurality of current sources 514, which results in corresponding delay times and hence corresponding "on" pulse widths. Since this is PFM control, each "on" pulse width will result in a corresponding switching frequency $f_1$ to $f_M$ respectively. Therefore, the relation between the currents $I_1$ to $I_M$ have to satisfy the conditions of spur elimination, as described above.

Referring again to FIG. 3, an error amplifier and compensation network 314 is connected in a feedback loop between energy storage elements 312 and the inputs of first and second comparators 307 and 309. The error amplifier and compensation network 314 accepts the reference signal 315 as an input, the error amplifier and compensation network 314 being configured to provide the error signal of the switching power converter 300 as input to the PWM control circuit 302 and the PFM control circuit 303. The signal from the error amplifier and compensation network 314 is used for controlling the one or more switching elements 308.

Figure 6:
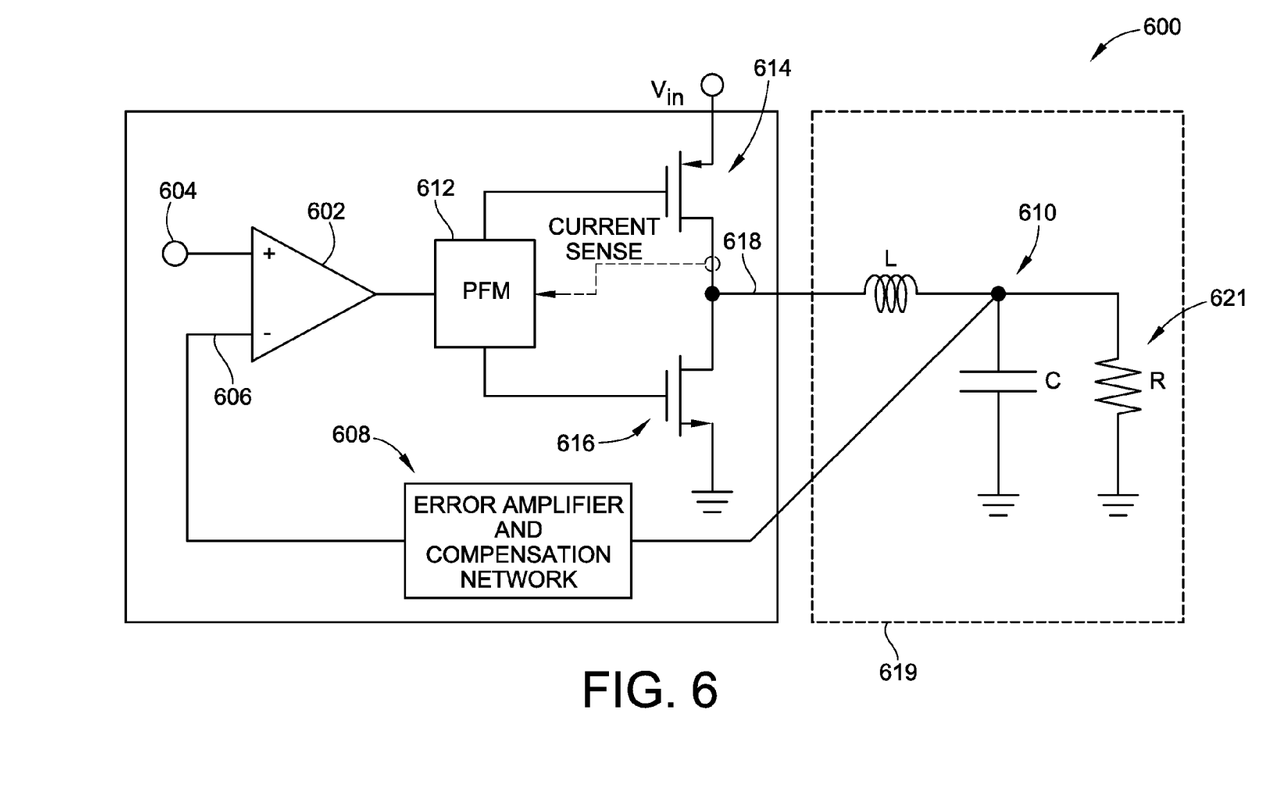
FIG. 6 is a schematic diagram which illustrates an exemplary embodiment of the switching power converter of FIG. 3 configured for pulse-frequency modulation.

The schematic diagram of FIG. 6 illustrates a particular embodiment of the switching power converter shown in FIG. 3. Switching power converter 600 is configured for pulse-frequency modulation (PFM). Comparator 602 has two inputs. A first input 604 is configured to accept an external input signal, while the second input 606 is configured to receive a signal from a feedback loop 608 coupled between the comparator 602 and an output 610 of the switching power converter 600. A PFM control circuit 612 operates a pair of switching elements 614 and 616. The switching elements 614, 616 have an output 618 which supplies a signal to circuitry 619 which includes energy storage element and load 621. In the embodiment of FIG. 6, the switching power converter 600 is a buck converter. In alternate embodiments of the invention, the switching power converter comprises, but is not limited to, a boost converter, a buck-boost converter, a flyback converter, a polar power amplifier, a supply modulator, and a class D amplifier.

Figure 7:
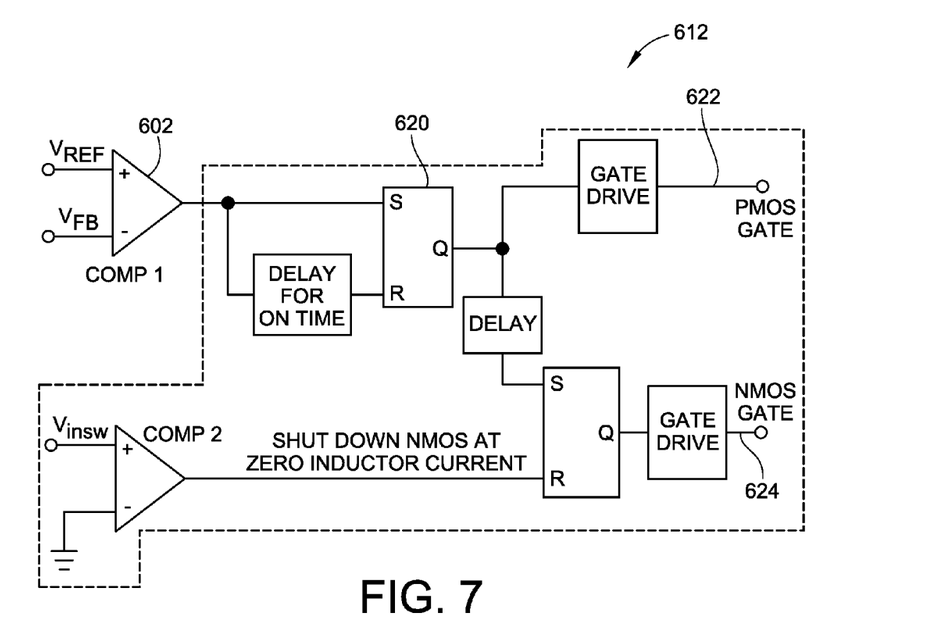
FIG. 7 is a schematic diagram which illustrates an exemplary embodiment of a control circuit which can be incorporated in the switching power converter of FIG. 6, and which is configured for pulse-frequency modulation.
Figure 8:
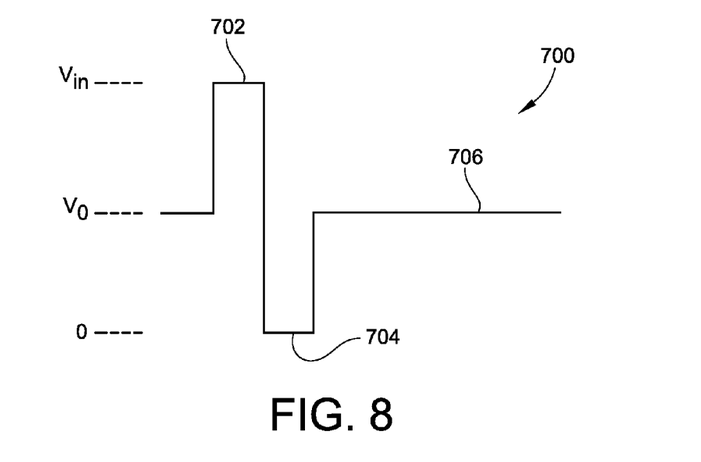
FIG. 8 illustrates an exemplary timing diagram showing voltage levels for signals generated by the switching converter of FIG. 6.

The schematic diagram of FIG. 7 illustrates an exemplary embodiment of the PFM control circuit 612. In this particular embodiment, the output of comparator 602 provides the inputs to an RS flip flop 620. PFM control circuit 612 has a first output 622 to control switching element 614 (shown in FIG. 6) and a second output 624 to control switching element 616 (shown in FIG. 6). The top portion of the timing diagram 700 of FIG. 8 shows the output 618 of switching elements 614, 616. As can be seen, the switching elements 614, 616 can produce an oscillating signal with three distinct voltage levels. When switching element 614 is off and switching element 616 is on, the output 610 is low or zero, also referred to as the "off" time 704, as shown in FIG. 8. When switching element 614 is on and switching element 616 is off, the output 610 is high, also referred to as the "on" time 702, as shown in FIG. 8 at $V_{in}$. When both switching elements 614, 616 are off, the output 618 is some voltage between zero and $V_{in}$ shown in FIG. 8 as $V_O$, and referred to as the "idle" time 706. The bottom portion of the timing diagram 700 of FIG. 8.

When using PFM as the means of control, during each switching cycle, the on-time 702 is fixed. The off time 704 is determined by the on-time 702, and therefore is also fixed. During idle time 706 when both switching elements 614, 616 (shown in FIG. 6) are off, the output 618 is virtually shorted to the switching converter output 610 (shown in FIG. 6). To spread spectrum, and thus reduce spurious noise, in PFM mode, we need only to randomize the "on" time 702. Since the "off" time 704 and idle time 706 are determined by the "on-time" 702 and load 621 (shown in FIG. 6). Thus, for a fixed load, the randomized "on-time" 702 results in fixed-cycle frequency hopping allowing for the elimination of spurious noise.

It is also envisioned that embodiments of the invention include switching power converters configured to randomly change both the switching frequency and the on-time of the switching device simultaneously using the circuitry described hereinabove.

The system and method described herein combines random frequency-hopping with random phase-chopping to control switching power converters. This new control method is designed to eliminate all spurs at the output of switching power converters, as opposed to traditional frequency-hopping techniques, where only a reduction in spur level is achieved at the expense of generating multiple other spurs. As such, embodiment of the invention include a system and method that maintains low noise-floor peaking which is confined to narrow frequency pockets, as opposed to the typical broad-band and large increase in the noise floor that results from using prior art techniques such as delta-sigma modulation or delta modulation. Furthermore, embodiments of the invention also include a system and method that eliminates duty cycle disturbances or transients associated with traditional frequency-hopping techniques, allowing maximum hopping rate between different switching frequencies with minimal changes in the low-frequency noise floor of the converter. Maximum hopping rate is accomplished by applying each switching frequency for a single cycle, which also leads to maximum spreading of spurious noise.

Furthermore, the new control scheme does not require any extra expensive and bulky passive components to eliminate spurs, as opposed to the prior art, where spurs are typically reduced by using extra passive components. Also, using the new scheme, there are no energy-inefficient linear amplifiers needed at the output of the converter to eliminate the spurs, as opposed to active ripple cancellation used in prior art. Moreover, the new design has no impact on the linearity of the converter loop and no total harmonic distortion (THD) is introduced to low-frequency signals applied at the reference voltage input of the converter such as in Class-D applications. The performance achieved by this new control scheme for switching power converters makes them suitable for directly powering many spurious-noise-sensitive analog and RF applications such as, but not limited to, class-D Amplifiers, RF Power Amplifiers, RF Low Noise Amplifiers, and RF Mixers. This results in a significant improvement in overall system efficiency and battery life in many portable applications. Additionally, the new control method has minimalist impact on the power consumption, circuit area, and design complexity of switching power converters, and thus introduces no cost or size overhead beyond traditional switching power converters.

Since the spur-elimination achieved by this invention relies on the unique relationship between the switching frequencies, the spurs are eliminated not only at the output of the converter, but at every switching node within the converter including at the input side. Therefore, other performance metrics are improved, such as electromagnetic interference (EMI).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of generating power from a switching device, the method comprising:
   generating an oscillating signal in the form of a series of pulse trains;
   randomly changing the switching frequency, or the on-time, or both the switching frequency and the on-time of the switching device;
   causing the switching device to change from a first frequency among a plurality of frequencies to a second frequency among the plurality of frequencies only at the end of a pulse train of the first frequency; and
   causing the second frequency to start at the beginning of its first pulse train such that no switching duty-cycle disturbance occurs at the time of the change from first to second frequency; and
   eliminating spurious noise by ensuring that a spur elimination condition governing the relationship between the plurality of frequencies is satisfied;
   wherein the spur elimination condition is satisfied when the ratio of the first frequency multiplied by the number of cycles of its pulse train to any other of the plurality of frequencies equals a rational number that is not an integer.

2. The method of claim 1, wherein randomly changing the switching frequency of the switching device comprises randomly changing the switching frequency of the switching device after one cycle at each frequency.

3. The method of claim 2, wherein the spur elimination condition is satisfied when the ratio of the first frequency to any other of the plurality of frequencies equals a rational number that is not an integer.

4. The method of claim 1, further comprising:
   controlling the switching device using pulse-width modulation;
   generating an end-of-cycle signal at the end of each pulse train; and
   using the end-of-cycle signal to trigger a random number generator whose output determines a frequency of the pulse train.

5. The method of claim 1, further comprising:
   controlling the switching device using pulse-frequency modulation;
   generating a beginning-of-pulse signal;
   using a delay circuit to generate an end-of-pulse signal; and
   using the end-of-pulse signal to trigger a random number counter whose output determines an off-time for each cycle of the pulse train.

6. The method of claim 1, wherein randomly changing the switching frequency, or the on-time, or both the switching frequency and the on-time of the switching device comprises randomly changing the switching frequency, or the on-time, or both the switching frequency and the on-time of one of a buck converter, a boost converter, flyback converter, an inverting buck-boost converter, and a non-inverting buck-boost converter.

7. The method of claim 1, wherein randomly changing the switching frequency, or the on-time, or both the switching frequency and the on-time of the switching device comprises randomly changing the switching frequency, or the on-time, or both the switching frequency and the on-time of a Class-D amplifier.

8. The method of claim 1, wherein randomly changing the switching frequency, or the on-time, or both the switching frequency and the on-time of the switching device comprises randomly changing the switching frequency, or the on-time, or both the switching frequency and the on-time of one of a supply modulator and a polar power amplifier.

9. The method of claim 1, wherein satisfying the spur elimination condition governing the relationship between the plurality of frequencies results in a reduction in electromagnetic interference (EMI).

10. A method of generating power from a switching device, the method comprising:
    generating an oscillating signal in the form of a series of pulse trains;
    randomly changing the switching frequency, or the on-time, or both the switching frequency and the on-time of the switching device;
    causing the switching device to change from a first frequency among a plurality of frequencies to a second frequency among the plurality of frequencies; and eliminating spurious noise by ensuring that a spur elimination condition governing the relationship between the plurality of frequencies is satisfied;

wherein the spur elimination condition is satisfied when the ratio of the first frequency multiplied by the number of cycles of its pulse train to any other of the plurality of frequencies equals a rational number that is not an integer.

11. The method of claim 10, wherein randomly changing the switching frequency of the switching device comprises randomly changing the switching frequency of the switching device after one cycle at each frequency.

12. The method of claim 11, wherein the spur elimination condition is satisfied when the ratio of the first frequency to any other of the plurality of frequencies equals a rational number that is not an integer.

13. The method of claim 10, further comprising:
controlling the switching device using pulse-width modulation;
generating an end-of-cycle signal at the end of each pulse train; and
using the end-of-cycle signal to trigger a random number generator whose output determines a frequency of the pulse train.

14. The method of claim 10, further comprising:
controlling the switching device using pulse-frequency modulation;
generating a beginning-of-pulse signal;
using a delay circuit to generate an end-of-pulse signal; and
using the end-of-pulse signal to trigger a random number counter whose output determines an off-time for each cycle of the pulse train.

15. The method of claim 10, wherein randomly changing the switching frequency, or the on-time, or both the switching frequency and the on-time of the switching device comprises randomly changing the switching frequency, or the on-time, or both the switching frequency and the on-time of one of a buck converter, a boost converter, flyback converter, an inverting buck-boost converter, and a non-inverting buck-boost converter.

* * * * *